(12) United States Patent
Siddiqui et al.

(10) Patent No.: US 11,600,237 B2
(45) Date of Patent: Mar. 7, 2023

(54) LCD DISPLAY FOR PIXEL LEVEL LOCAL DIMMING AND DYNAMIC PRIVACY

(71) Applicant: Dell Products L.P., Round Rock, TX (US)

(72) Inventors: Asim Siddiqui, Cedar Park, TX (US); Jong Seo Lee, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/388,468

(22) Filed: Jul. 29, 2021

(65) Prior Publication Data

US 2023/0037248 A1    Feb. 2, 2023

(51) Int. Cl.
| | | |
|---|---|---|
| *G09G 3/36* | (2006.01) | |
| *G09G 3/34* | (2006.01) | |
| *G02F 1/13* | (2006.01) | |
| *G02F 1/13357* | (2006.01) | |

(52) U.S. Cl.
CPC ........... *G09G 3/342* (2013.01); *G02F 1/1323* (2013.01); *G02F 1/133615* (2013.01); *G09G 2320/028* (2013.01); *G09G 2320/0686* (2013.01)

(58) Field of Classification Search
CPC ............. G09G 3/342; G09G 2320/028; G09G 2320/0686; G02F 1/1323; G02F 1/133615
See application file for complete search history.

(56) References Cited

U.S. PATENT DOCUMENTS

| | | | |
|---|---|---|---|
| 7,170,680 B2 | 1/2007 | Macmaster | |
| 9,240,144 B2 | 1/2016 | Cho et al. | |
| 2013/0106923 A1* | 5/2013 | Shields | G02F 1/133606 345/102 |
| 2015/0213280 A1* | 7/2015 | Chang | G06F 21/70 726/27 |
| 2016/0225337 A1* | 8/2016 | Ek | H04N 13/337 |
| 2017/0263208 A1* | 9/2017 | Imai | G09G 5/373 |
| 2018/0364504 A1* | 12/2018 | Bae | G02F 1/133308 |
| 2019/0353944 A1* | 11/2019 | Acreman | G02F 1/134309 |

\* cited by examiner

*Primary Examiner* — Sanghyuk Park
(74) *Attorney, Agent, or Firm* — Larson Newman, LLP

(57) ABSTRACT

A liquid crystal display (LCD) device includes an LCD panel with a number (N) of pixel elements for displaying an image. A dimming panel includes N dimming elements. The dimming panel has a first mode to apply a uniform dimming to the N dimming elements to provide a privacy function for the LCD device. The dimming panel further has a second mode to a apply a per-element dimming to provide a local dimming function for the LCD device.

20 Claims, 5 Drawing Sheets

LCD DISPLAY FOR PIXEL LEVEL LOCAL DIMMING AND DYNAMIC PRIVACY

FIELD OF THE DISCLOSURE

This disclosure generally relates to information handling systems, and more particularly relates to an LCD display with pixel level local dimming and dynamic privacy in a display device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A liquid crystal display (LCD) device may include an LCD panel with a number (N) of pixel elements for displaying an image. A dimming panel may include N dimming elements. The dimming panel may operate in a first mode to apply a uniform dimming to the N dimming elements to provide a privacy function for the LCD device. The dimming panel may further operate in a second mode to a apply a per-element dimming to provide a local dimming function for the LCD device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
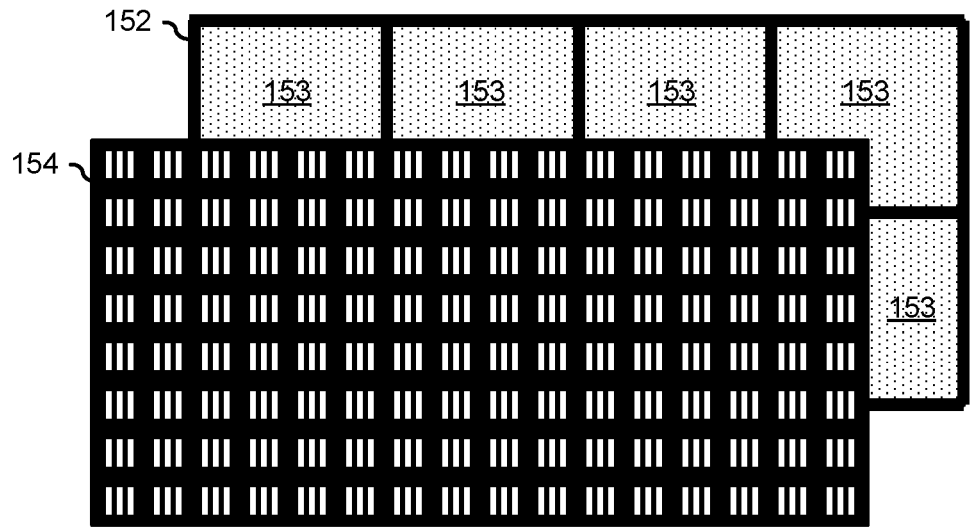
FIG. 1 illustrates liquid crystal display (LCD) panels according to the prior art.
Figure 1:
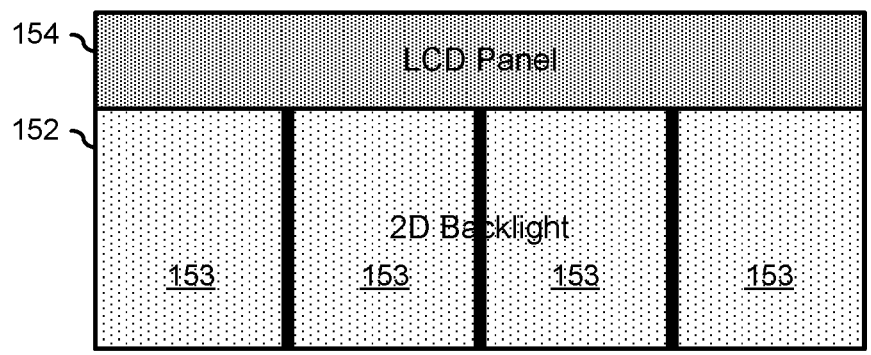
Figure 1:
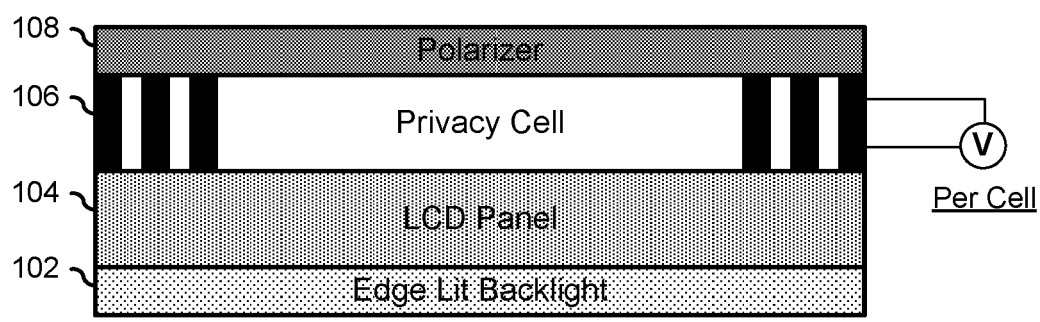

FIG. 1 illustrates Liquid Crystal Display (LCD) display devices 100 and 150 in accordance with the prior art. LCD display device 100 includes an edge-lit backlight 102, an LCD display panel 104, an LCD privacy panel 106, and a polarizer film 108. LCD display device 100 is configured to provide selectable privacy modes that limit the viewing angle of the display device. In particular, by energizing LCD privacy panel 106, a louver effect is created that columnates the light that is emitted from backlight 102 and passed through LCD display panel 104, thereby restricting the angle at which the content displayed on LCD display device 100 can effectively be viewed. LCD display device 150 includes a two-dimensional (2D) backlight 152 and a LCD display panel 154. LCD display device 150 is configured to provide zone based light level control for improved High Dynamic Range (HDR) and Contrast Ratio (CR) for improved image clarity and definition of the display device.

In particular, by selectively varying the light emitted by 2D backlight 152 in the various zones 153, the brightness or darkness of the zones is varied, producing a displayed image with higher dynamic range and higher contrast ratio than can be achieved with a monolithic backlight such as backlight 102. It will be understood that the typical 2D backlight is a thick device and the use thereof increases the overall depth of the LCD display device. Thus a user of LCD display devices is left with a choice between a thin LCD display device that provides privacy features, a thicker LCD display device that provides HDR/CR performance, or, by adding an LCD privacy cell to a 2D backlit LCD display device, a much thicker LCD display device that provides both privacy features and HDR/CR performance. However, particularly in mobile computing devices, thicker LCD display devices are less desirable than thinner LCD display devices.

Figure 2:
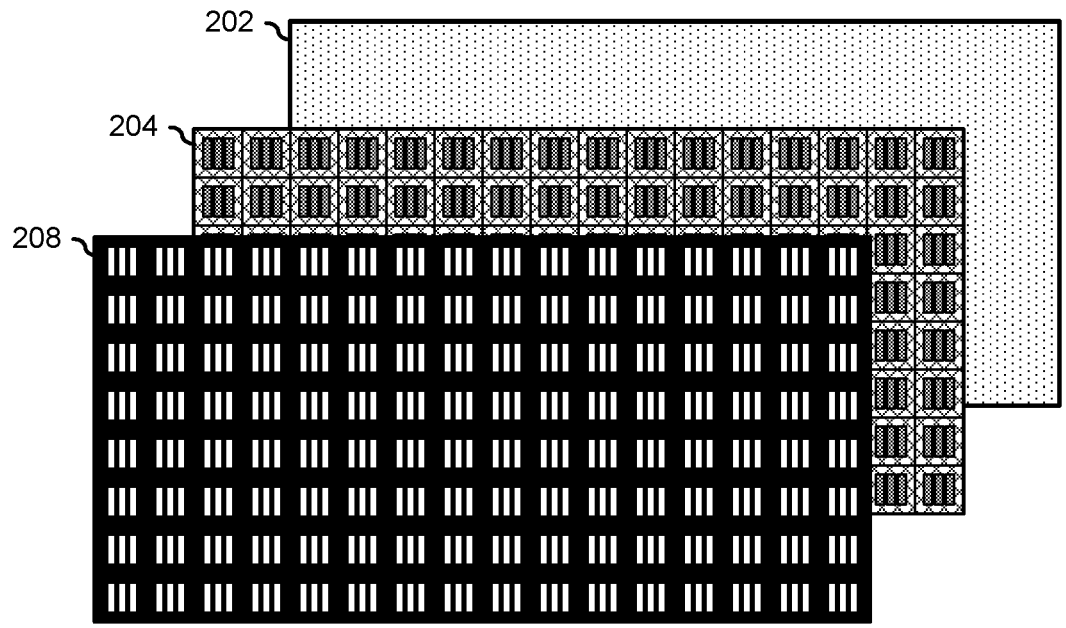
FIG. 2 illustrates an LCD panel according to an embodiment of the current disclosure.
Figure 2:
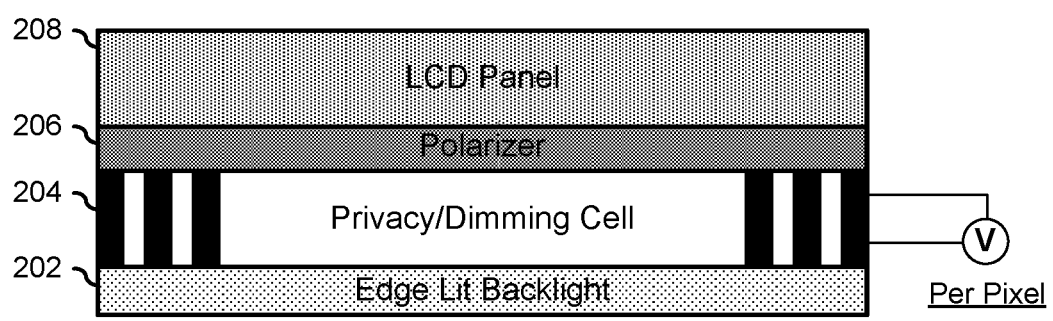

FIG. 2 illustrates an LCD display device 200 including an edge-light backlight 202, an LCD privacy/dimming panel 204, a polarizer film 206, and an LCD display panel 208. Both the location and the control of LCD privacy/dimming panel 204 are modified as compared with LCD privacy panel 106 in FIG. 1. As a first matter, LCD privacy/dimming panel 204 is moved next to backlight 202. Here, when LCD display device 200 is in a privacy mode, LCD privacy/dimming panel 204 is energized and creates a louver effect that columnates the light that is emitted from backlight 102 prior to being passed through LCD display panel 208, thereby restricting the angle at which the content displayed on LCD display device 200 can effectively be viewed.

LCD privacy/dimming panel 204 includes per-pixel control of the brightness of the light that is permitted through the LCD privacy/dimming panel, thereby permitting a per-pixel control of the dynamic range and contrast ratio of the image displayed on LCD display device 200. Thus, when LCD display device 200 is in a HDR/CR mode, each pixel of LCD privacy/dimming panel 204 is individually controlled to permit a variable amount of the light emitted from backlight 202 to pass through LCD display panel 208, thereby allowing the control of the dynamic range and contrast of the displayed image on the LCD display device.

Figure 3:
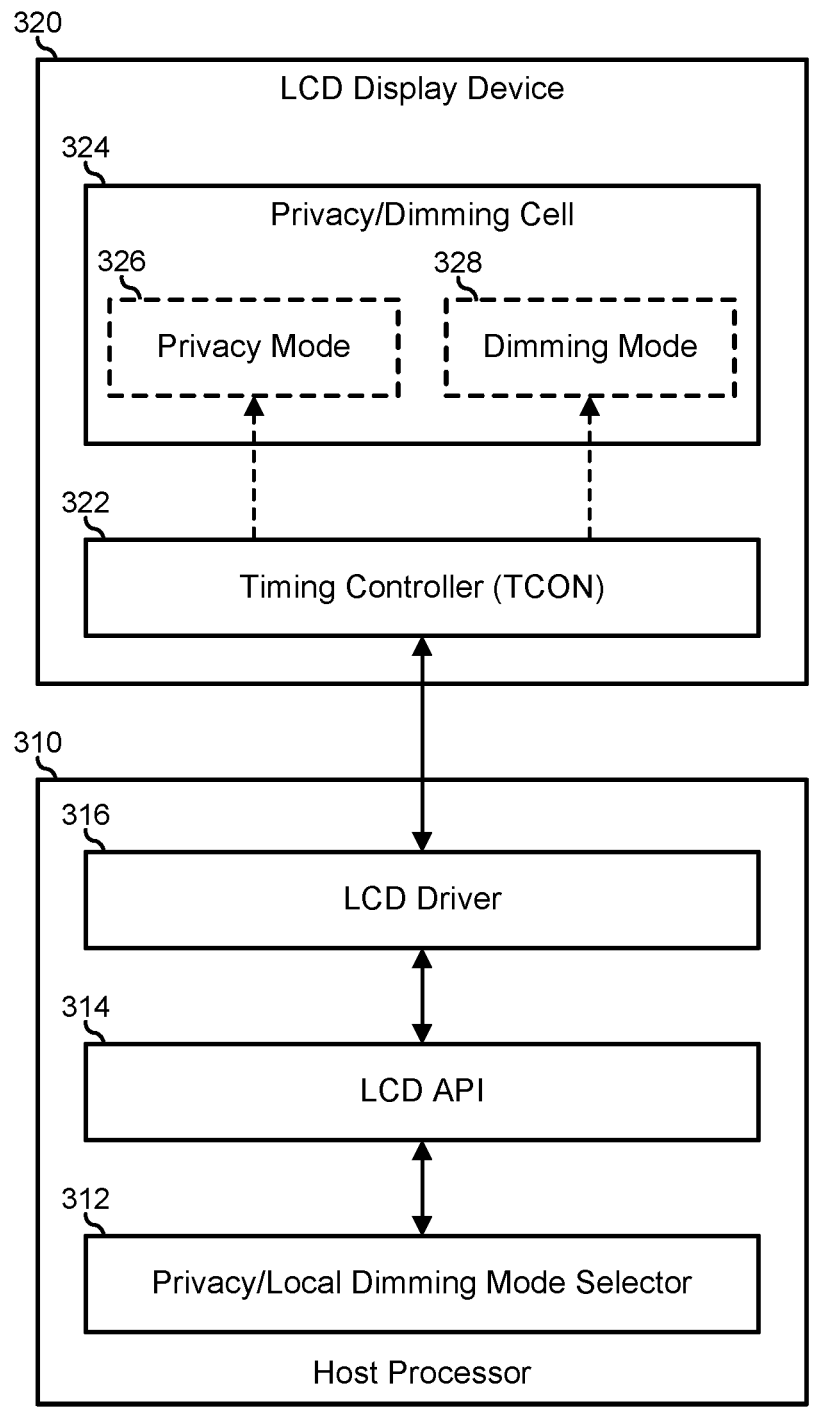
FIG. 3 is a block diagram illustrating an information handling system according to an embodiment of the current disclosure.

FIG. 3 illustrates an information handling system 300 including a host processor 310 and a LCD display device 320 similar to LCD display device 200. Host processor 310 represents the hardware typically associated with an information handling system for providing the processing tasks associated with the information handling system, and may be understood to include one or more CPU, graphics processing units (GPUs), I/O devices, memory and storage devices, human interface devices, and the like. Host processor 310 will be further understood to execute various functional code to provide a hosted processing environment, and may include a Basic Input/Output System (BIOS)/Universal Extensible Firmware Interface (UEFI), various firmware components for monitoring, managing, and maintaining the hardware components of the host processor, including drivers, utilities, application programming interfaces (APIs), and the like, an operating system (OS), one or more software applications, programs, workloads, tasks, or the like.

As such, host processor 310 operates to instantiate a mode selector 312, a LCD API 314, and a LCD driver 316. Mode selector 312 provides a user of information handling system 300 to select between operating LCD display device 320 in either a privacy mode or a local dimming mode. In a particular embodiment, mode selector 312 represent a user interface that permits a user to select between the privacy mode and the local dimming mode. For example, mode selector 312 may represent a BIOS setup screen option, or a menu option accessible through an OS interface. In either case, a user may invoke either the privacy mode or the local dimming mode, as needed or desired.

In another embodiment, mode selector 312 operates to determine the applications running on host processor 310, and to set the mode based upon the running applications. For example, when host processor 310 is running office productivity applications, such as a word processor, an email application, a spreadsheet or database, a web hosting application, or the like, mode selector 312 may operate to select the privacy mode in order to ensure that the contents displayed on LCD display device 320 are not readily visible to onlookers. On the other hand when host processor 310 is running media content, such as audio or video content, streaming content, or the like, mode selector 312 may operate to select the local dimming mode in order to provide HDR/high-CR viewing of the media content.

LCD driver 316 operates to control LCD display device 320. As such, LCD driver 316 is typically provided by a manufacturer of LCD display device 320, and provides standardized control signals to the LCD display device and any custom control signals associated with unique features of the LCD display device. In particular, LCD driver 316 may provide setup options for screen refresh rates implemented by LCD display device 320, screen resolution settings, or the like, as may be needed by host processor 310 to display content on the LCD display device. In addition, LCD driver 316 provides input information to LCD display device 320 to implement the selected mode, as may be dictated by a manufacturer of the LCD display device. As such, once a mode is selected by mode selector 312, the mode selector provides an output to LCD API 314 that operates to provide a bridge between the operating environment within which the mode selector operates (e.g., BIOS setup screen or OS menu option) and the inputs needed by LCD driver 316 to implement the selected mode.

In a particular embodiment, LCD display device 320 includes a timing controller (TCON) 322 and a LCD privacy/dimming cell 324. Timing controller 322 receives a mode selection signal from LCD driver 316 and the timing controller operates to drive LCD privacy/dimming cell 324 in one of a privacy mode 326 or a local dimming mode 328. Here, in privacy mode 326, timing controller 322 operates to drive the elements of LCD privacy/dimming cell 324 with a common level to provide a columnated image on LCD display device 320. In a first case timing controller 322 can provide a predetermined value to all of the pixel elements of LCD privacy/dimming cell 322 to provide for the privacy function. Here further, the predetermined value may be selectable to provide a variability in the degree of privacy, that is, the viewing angle, provided by LCD privacy/dimming cell 322.

In another case, a GPU of information handling system 300 may provide a set offset to the data provided to timing controller 322 that is received by the timing controller and is interpreted by the timing controller as a degree of privacy to apply to LCD privacy/dimming cell 322. In local dimming mode 328, timing controller 322 operates to individually drive the elements of LCD privacy dimming cell 324 in order to provide local dimming to increase the HDR/high-CR performance of the LCD display device. In particular, timing controller 322 can operate to receive per-pixel dimming information from a GPU of information handling system 300 and to send the dimming information to LCD privacy/dimming cell 324 to implement the per-pixel dimming as determined by the GPU.

Figure 4:
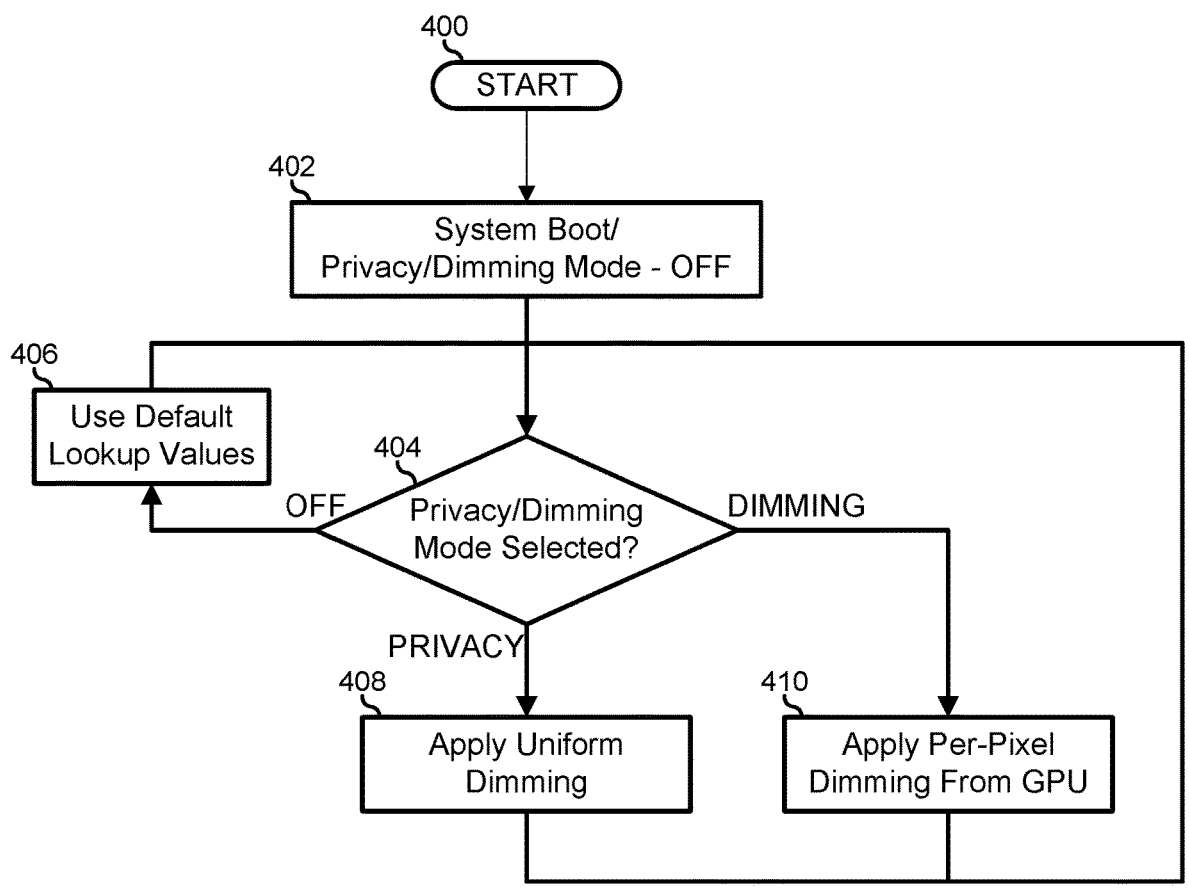
FIG. 4 is a flow chart illustrating a method for providing pixel level local dimming and dynamic privacy in an LCD panel according to an embodiment of the current disclosure.

FIG. 4 illustrates a method for providing pixel level local dimming and dynamic privacy in a LCD panel, starting at block 400. An information handling system including an LCD display panel similar to LCD display device 200, is booted and a privacy/dimming mode of the information handling system is set to OFF in block 402. A decision is made as to whether the privacy/dimming mode is still set to Off, or if the privacy/dimming mode is set to either the PRIVACY mode or the DIMMING mode in decision block 404. Here, a user interface may give the user or the information handling system the option to select between OFF, PRIVACY, and DIMMING modes, or the information handling system may determine a mode based upon the usage and running applications on the information handling system.

If the information handling system is in the OFF mode, the "OFF" branch of decision block 404 is taken, the default values in a frame buffer are provided for the image data to a timing controller of the information handling system in block 406, and the method returns to decision block 404 until either the PRIVACY mode or the DIMMING mode is selected. When the PRIVACY mode is selected, the "PRIVACY" branch of decision block 404 is taken, a uniform dimming is provided to the image data to the timing controller, or the timing controller receives an input to provide a uniform dimming to the image data provided in block 408, and the method returns to decision block 404. When the DIMMING mode is selected, the "DIMMING" branch of decision block 404 is taken, a GPU of the information handling system applies the dimming information to the image data to the timing controller in block 410, and the method returns to decision block 404.

Figure 5:
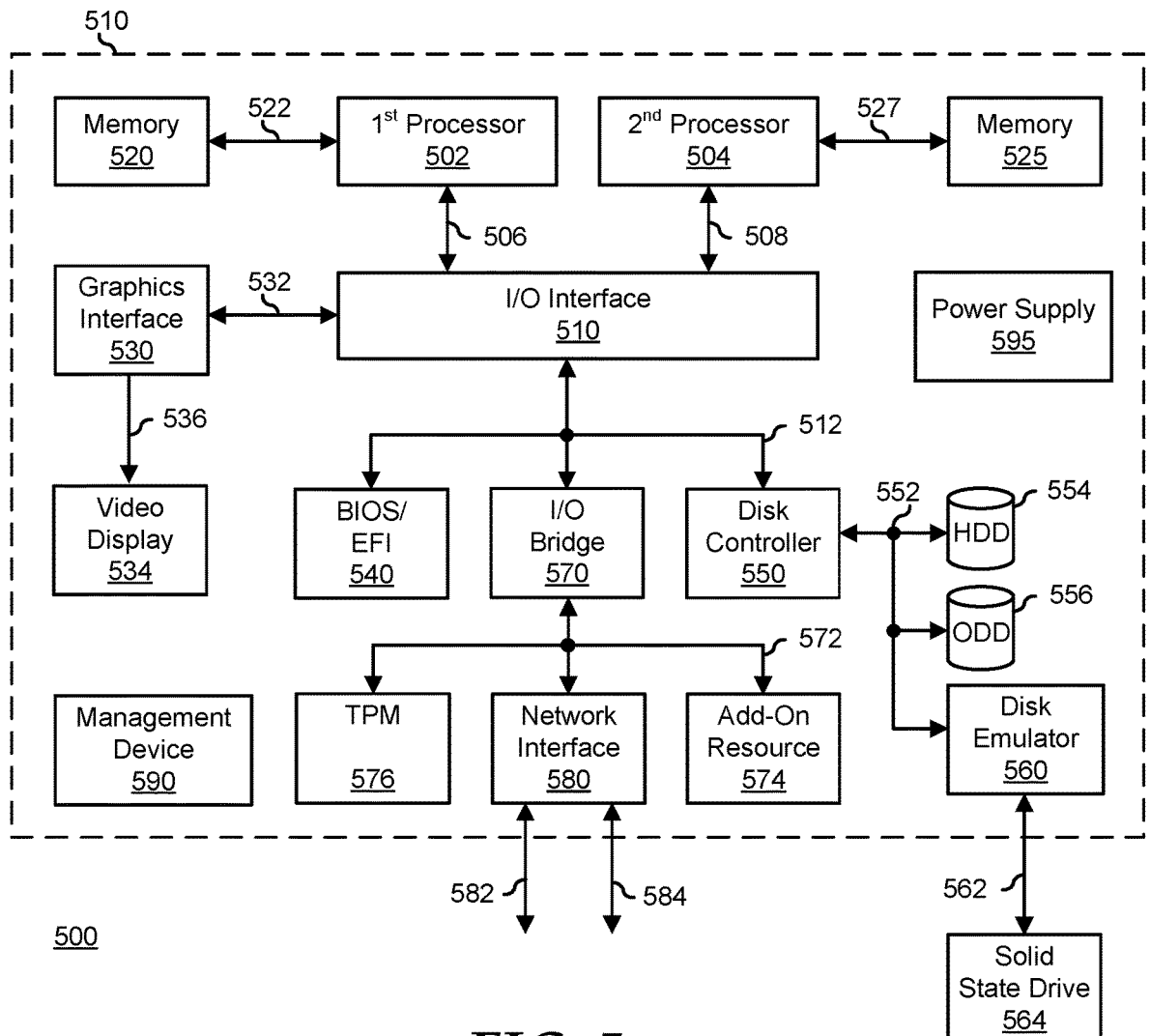
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operating a liquid crystal display (LCD) device, the method comprising:
    providing, on an LCD panel of the LCD device, a number (N) of pixel elements for displaying an image;
    providing, on a dimming panel having of the LCD device, N dimming elements;
    providing the dimming panel with a first mode to apply a uniform dimming to the N dimming elements to collimate the image to provide a privacy function for the LCD device; and
    providing the dimming panel with a second mode to a apply a per-element dimming to provide a local dimming function for the LCD device;
    determining, by a processor of an information handling system that includes the LCD device, that a first type of application is running on the information handling system;
    setting, by the processor, the dimming panel to operate in the first mode in response to determining that the first type of application is running;
    determining, by the processor, that a second type of application is running on the information handling system; and
    setting, by the processor, the dimming panel to operate in the second mode in response to determining that the second type of application is running.

2. The method of claim 1, further comprising illuminating, by a backlight of the LCD device, the LCD panel through the dimming panel.

3. The method of claim 2, wherein the backlight is an edge-lit backlight.

4. The method of claim 1, further comprising receiving, by a timing controller of the LCD device, image data to drive the N pixel elements to display the image.

5. The method of claim 4, further comprising receiving, by the timing controller, dimming data to drive the N dimming elements.

6. The method of claim 5, wherein, in the first mode, the dimming data provides the uniform dimming.

7. The method device of claim 6, wherein, in the second mode, the dimming data provides the local dimming.

8. The method device of claim 5, further comprising receiving, by the timing controller, a signal to operate in the first mode.

9. The method device of claim 8, further comprising providing, by the timing controller in response to receiving the signal, a selectable preset dimming to the N dimming elements.

10. An information handling system, comprising:
    a processor; and
    a liquid crystal display (LCD) device, including:
        an LCD panel having a number (N) of pixel elements for displaying an image; and
        a dimming panel having N dimming elements;
    wherein the processor provides data associated with the image to the LCD device;
    wherein the dimming panel has a first mode to apply a uniform dimming to the N dimming elements to collimate the image to provide a privacy function for the LCD device, and has a second mode to a apply a per-element dimming to provide a local dimming function for the LCD device; and wherein the processor is further configured to:
  determine that a first type of application is running on the information handling system;
  set the dimming panel to operate in the first mode in response to determining that the first type of application is running;
  determine that a second type of application is running on the information handling system; and
  set the dimming panel to operate in the second mode in response to determining that the second type of application is running.

11. The information handling system device of claim 10, further comprising a backlight configured to illuminate the LCD panel through the dimming panel.

12. The information handling system device of claim 11, wherein the backlight is an edge-lit backlight.

13. The information handling system device of claim 10, further comprising a timing controller configured to receive image data to drive the N pixel elements to display the image.

14. The information handling system device of claim 13, wherein the timing controller is further configured to receive dimming data to drive the N dimming elements.

15. The information handling system device of claim 14, wherein, in the first mode, the dimming data provides the uniform dimming.

16. The information handling system device of claim 15, wherein, in the second mode, the dimming data provides the local dimming.

17. The information handling system device of claim 14, wherein the timing controller is further configured to receive a signal to operate in the first mode.

18. The information handling system device of claim 17, wherein, in response to receiving the signal, the timing controller provides a preset dimming to the N dimming elements.

19. The information handling system device of claim 18, wherein the preset dimming is selectable.

20. An information handling system, comprising:
  a processor configured to instantiate a liquid crystal display (LCD) application programming interface (API); and
  a LCD device, including an LCD panel having a number (N) of pixel elements for displaying an image, and a dimming panel having N dimming elements;
  wherein the processor provides data associated with the image to the LCD device;
  wherein the dimming panel has a first mode to apply a uniform dimming to the N dimming elements to collimate the image to provide a privacy function for the LCD device, and has a second mode to a apply a per-element dimming to provide a local dimming function for the LCD device; and
  wherein the processor is further configured to:
    determine that a first type of application is running on the information handling system;
    direct the LCD API to set the dimming panel to operate in the first mode in response to determining that the first type of application is running;
    determine that a second type of application is running on the information handling system; and
    direct the LCD API to set the dimming panel to operate in the second mode in response to determining that the second type of application is running.

* * * * *